United States Patent [19]
Magarshak

[11] Patent Number: 5,912,674
[45] Date of Patent: Jun. 15, 1999

[54] SYSTEM AND METHOD FOR VISUAL REPRESENTATION OF LARGE COLLECTIONS OF DATA BY TWO-DIMENSIONAL MAPS CREATED FROM PLANAR GRAPHS

[76] Inventor: Yuri Magarshak, 3033 Brighton 13th St., Apt. 1A, Brooklyn, N.Y. 11235

[21] Appl. No.: 08/963,052

[22] Filed: Nov. 3, 1997

[51] Int. Cl.⁶ .................................................. G06T 11/00
[52] U.S. Cl. ........................................................ 345/440
[58] Field of Search ............................................ 345/440

[56] References Cited

U.S. PATENT DOCUMENTS

| | | | |
|---|---|---|---|
| 5,251,290 | 10/1993 | Pabon ....................................... | 345/440 |
| 5,307,455 | 4/1994 | Higgins et al. .......................... | 345/440 |
| 5,408,596 | 4/1995 | Nonaka et al. .......................... | 345/440 |
| 5,416,890 | 5/1995 | Beretta .................................... | 345/440 |
| 5,515,488 | 5/1996 | Hoppe et al. ............................ | 345/440 |
| 5,596,703 | 1/1997 | Eick et al. ............................... | 345/440 |
| 5,619,632 | 4/1997 | Lamping et al. ........................ | 345/441 |
| 5,623,590 | 4/1997 | Becker et al. ........................... | 345/440 |
| 5,751,931 | 5/1998 | Cox et al. ................................ | 345/440 |
| 5,818,455 | 10/1998 | Stone et al. .............................. | 345/433 |

OTHER PUBLICATIONS

Signore, O. "Exploiting Navagation Capabilities in Hypertext/Hypermedia", Proc. of the 29th Hawaii Int'l Conference on System Sciences, Las Angeles: IEEE Computer Soc. Press, v.2, pp. 165–175, Jan. 1996.

Yoh–Han Pao et al. "Visualization of Data Structures and Machine Learning of Rules", Proc. Intelligent Information Systems '97, Las Alamitos: IEEE Comp. Soc. Press, pp. 128–132, Dec. 10, 1997.

Junger, M. et al. "Solving the Maximum Weight Planar Subgraph Problem by Branch and Cut", Proc. of the 3rd Conference on Integer Programming and Combinatorial Optimization, pp. 479–492, Dec. 1993.

*Primary Examiner*—Mark R. Powell
*Assistant Examiner*—Jeffrey Allen Rossi
*Attorney, Agent, or Firm*—William H. Eilberg

[57] ABSTRACT

A large collection of data is represented as a hierarchy of two-dimensional maps displayed on a computer monitor. The collection of data is used to generate an incidence matrix, representing interrelationships among elements of the data. The incidence matrix is then used to construct a hierarchy of planar graphs. Each graph is converted into a two-dimensional map which shows conventional geographical features, these geographical features being used to represent symbolically various aspects of the data. The user of the system sees a large-scale map, preferably having the form of a globe, which represents the entire data collection. By expanding more detailed portions of the large-scale map, the user gains access to a plurality of lower-level maps which represent more detailed information about the collection of data. At the lowest level of the hierarchy, the user may see a simple graph which shows the interrelationships among data elements in the data collection, and which allows the user to access basic data elements directly. The invention therefore permits the user to analyze a large data collection, and/or to study large systems, in a manner not possible by viewing data in a conventional way.

13 Claims, 10 Drawing Sheets

SYSTEM AND METHOD FOR VISUAL REPRESENTATION OF LARGE COLLECTIONS OF DATA BY TWO-DIMENSIONAL MAPS CREATED FROM PLANAR GRAPHS

BACKGROUND OF THE INVENTION

The present invention includes an apparatus and method for representing a large system, or a large collection of data, in a visual format, preferably on a computer display.

Methods and systems have been devised for the display of selected portions of large collections of data. One simple method of displaying data is to construct a list of items which satisfy a specified search criterion, and to display the list on a video screen, or to print the list on paper. Another method is to prepare a conventional two-dimensional plot of the data. Still another method is to construct a "tree" which represents various hierarchical levels within the data collection. Another method is to query the system which stores the data collection using one or more key words, and to derive results based on the number of records found which match such key words.

The major disadvantage of the prior art methods mentioned above is that they provide only a limited overview of the data being analyzed. The prior art methods are essentially one-dimensional; they permit the user to view a list, or its equivalent, but they do not provide a complete graphical representation of the data.

Another disadvantage of the methods described above is that they are static. That is, one can query a database to obtain certain results, using the prior art methods, but one cannot easily navigate from one area of the data collection to another, except possibly by simple linear movements.

The human mind naturally perceives two and three-dimensional objects in space. The present invention takes advantage of this natural ability of the human mind, by providing a system and method which provides two-dimensional visual representations of collections of data, especially large collections of data. The visual representations produced by the present invention can be conveniently displayed on a computer screen, and in a manner such that the user can navigate easily from one area of the data collection to another.

SUMMARY OF THE INVENTION

The present invention includes a computer program which stores information about a collection of data, and displays such information graphically, as a hierarchy of two-dimensional maps. The user of the program sees a high-level map which represents the entire data collection. The high-level map therefore shows a relatively coarse level of detail. By "clicking" a mouse on a desired area of this map, the user obtains another map which represents a more detailed picture of the area selected. By repeatedly clicking the mouse on desired areas, the user can obtain maps relating to areas of lower and lower levels in the hierarchy, thus obtaining more and more detailed information about the collection of data.

Each map seen by the user has the appearance of a conventional map. That is, it may contain standard geographical features, such as countries, borders between countries, rivers, lakes, oceans, mountains, and the like. In most cases, these geographical features are only symbolic; they are used to represent interrelationships among elements of the collection of data. The hierarchy of maps allows the user to visualize the interrelationships between various areas of the data collection, which interrelationships would not be readily apparent from studying the basic data alone.

At the bottom of the hierarchy, the user may see a simple planar graph. The presence of a graph tells the user that the bottom of the hierarchy has been reached. By clicking on a vertex of the graph, the user may directly view a file or other structure belonging to the original collection of data.

The hierarchy of maps is created by deriving an incidence matrix representing interactions or interrelationships between elements of the collection of data. The incidence matrix is in one-to-one correspondence with a graph having edges and vertices. The incidence matrix, which in general is very large, can be subdivided into smaller matrices (each of which corresponds to a graph), by separating the matrix/graph into clusters. Each cluster corresponds to a smaller matrix/graph which-can be subdivided in a similar manner. The result is a large number of planar graphs, each of which is in one-to-one correspondence with a map that can be displayed on a video monitor. At the highest level there is a matrix/graph of interactions among clusters. At the next lower level there are matrices/graphs pertaining to the clusters of the higher level. The data collection can be broken down such that all of its elements are covered by a plurality of levels in the hierarchy.

The present invention therefore has the primary object of providing a system and method of visually representing a large collection of data.

The invention has the further object of representing data as a hierarchy of two-dimensional maps.

The invention has the further object of representing data as stated above, wherein the user can "expand" a region of a map by clicking a mouse and thereby obtaining a map representing a detail of the region of interest.

The invention has the further object of enabling a user to visualize interrelationships between elements of a collection of data.

The invention has the further object of discovering interrelationships between elements of a collection of data, where such interrelationships would not be apparent from viewing such data directly.

The invention has the further object of providing a programmed computer which performs the methods described above.

The reader skilled in the art will recognize other objects and advantages of the invention, from a reading of the following brief description of the drawings, the detailed description of the invention, and the appended claims.

DETAILED DESCRIPTION OF THE INVENTION

According to the method of the present invention, one begins with a data collection which represents a discrete, but possibly very large, set of items. The data collection is first converted into a matrix which represents interactions or interrelationships between elements of the collection. This matrix is called the "incidence matrix". The incidence matrix can be represented as a graph, such that if $a_{ij}$ is an element of the incidence matrix, and if $a_{ij}$ is non-zero, then the corresponding graph has a line joining vertices i and j, and the line has a value equal to the magnitude of $a_{ij}$. If $a_{ij}$ is zero, then the graph has no line joining vertices i and j.

The incidence matrix is based on the interactions or interrelation-ships among elements of the data collection. For example, suppose that the data collection is the set of all U.S. patent subclasses, and all of the patents contained therein. An incidence matrix could be constructed wherein the number of rows or columns equals the total number of subclasses in the entire system. For those pairs of subclasses which have patents in common, i.e. where one or more patents are cross-referenced between those subclasses, the corresponding element of the incidence matrix would be non-zero. The magnitude of the matrix element could represent the strength of the relationship, which, in this example, could be the number of cross-referenced patents that appear in both subclasses of the pair. For those pairs of subclasses which have no patents in common, the corresponding matrix element would be zero.

Clearly, the incidence matrix in the above example, and in most other practical situations, will be very large. However, since most pairs of patent subclasses, selected at random, are likely to have no patents in common, most elements of the very large incidence matrix will be zero. The same is true in most other practical applications. One can use the fact that many matrix elements are zero to simplify the analysis, as described below.

In general, the graph corresponding to the incidence matrix will have some regions in which the density of edges is very great, and other regions in which the density of edges is small. Clearly, where the matrix has many zero elements, the corresponding graph will have a small density of edges. A region in which there are many edges, relative to the number of vertices, is called a "cluster". The incidence matrix, or its corresponding graph, can be subdivided into a plurality of such clusters. A new graph is constructed, in which each cluster corresponds to a vertex of the new graph. If the clusters are properly chosen, the new graph is a planar graph. That is, it is a graph which can be depicted in a two-dimensional plane without having any intersecting edges.

Thus, the very complicated graph corresponding to the very large incidence matrix is reduced to a somewhat less complicated graph in which the vertices correspond to clusters in the original graph. This less complicated graph can be analyzed in a similar manner. That is, one can construct another, less complicated graph, having vertices which correspond to clusters of the previous graph. In this way, one proceeds "upward" through a hierarchy, creating graphs of decreasing complexity. The farther up the hierarchy, the less detail is shown by each graph.

Eventually, the entire data structure is represented as a hierarchy of planar graphs. A given cluster, in general, is a subcluster of a cluster appearing at a higher level in the hierarchy. Also, a typical cluster, in general, has one or more subclusters at a lower level in the hierarchy. At each level in the hierarchy, the relationships among the clusters in that level can be depicted as a planar graph.

Each planar graph can be associated with a two-dimensional map which contains conventional geographical features such as boundaries between countries, rivers, lakes, oceans, mountains, and the like. In general, these geographical features have no physical significance, other than as visual symbols used to represent the interrelationships among the data. In the example of patent subclasses given above, the map would represent interrelationships among various patent subclasses. In some specific cases, however, such as where the system is used to analyze interrelationships between actual countries of the world, the geographical features might also be interpreted according to their ordinary meanings.

A specific set of rules, which is part of a computer program stored in a computer memory, transforms any given planar graph into a two-dimensional map. Since the information defining each planar graph is also stored in a computer memory, the computer can be programmed to generate automatically the two-dimensional map corresponding to any given graph.

The present invention therefore includes a computer program which contains a hierarchy of two-dimensional maps corresponding to a hierarchy of graphs which depicts the collection of data being analyzed. In operating this program, the user can observe the system from the most macroscopic point of view, i.e. by generating a map which corresponds to the graph which represents the highest level of the set of clusters. Then, by clicking a mouse on a portion of this graph, the user causes the program to generate a map representing the detail of the selected portion, the latter detail being derived from the next lower set of clusters in the hierarchy. The process can be repeated until the user has exhausted the limits of the hierarchy.

In the preferred embodiment, when the user reaches the "bottom" of the hierarchy, the image displayed is that of a graph, not a map. The appearance of a graph instead of a map is a signal to the user that the bottom of the hierarchy has been reached. The user may click on the vertices of the graph to view files, or other data structures, directly. In the example of the patent classifications given above, the bottom of the hierarchy might comprise individual patents contained within a specific subclass. Each vertex of the bottom-level graph would therefore represent a patent. By clicking on one such vertex, the user would obtain the text of the actual patent.

In the preferred embodiment, the number of clusters represented in an individual planar graph is in the range of about 7–100, but the invention is not limited by the number of such levels.

In dividing the initial incidence matrix into clusters, one can make certain simplifying assumptions which reduce the amount of computation needed to generate the desired maps. In particular, the system can be programmed to ignore those connections between clusters where the connections are relatively weak (i.e. where the connections are relatively few in number, for example). In general, the smaller the number of connections, the easier it will be to form a planar graph from the matrix. Ignoring the weak connections therefore simplifies the process of deriving a planar graph from a given matrix.

The incidence matrix contains information not only about the presence or absence of an interaction between a pair of elements of data, but also about the amplitude of such interaction. The presence of an interaction can be represented by the presence of a non-zero element of the incidence matrix, while the strength of the interaction can be represented as the magnitude of that matrix element. This magnitude can eventually be translated into a visual representation on the two-dimensional map, such as by marking, coloring, or otherwise highlighting features of the map.

In the embodiment described above, the entire collection of data is thus represented by a "tree" of clusters. In a more general case, one can have clusters which interact with individual data elements, and there can be one or more separate incidence matrices containing information on such interactions.

The process of converting a non-planar graph into a planar graph is not always easy, but mathematical methods have been derived which enable one to perform this conversion. In general, one can convert a non-planar graph into a planar graph by deleting one or more edges of the non-planar graph. By deleting those edges which are least "necessary", i.e. which represent the weakest interactions, one can usually obtain an approximation which permits the system to obtain the necessary planar graphs in an economical manner, and without destroying significant information.

Figure 1A:
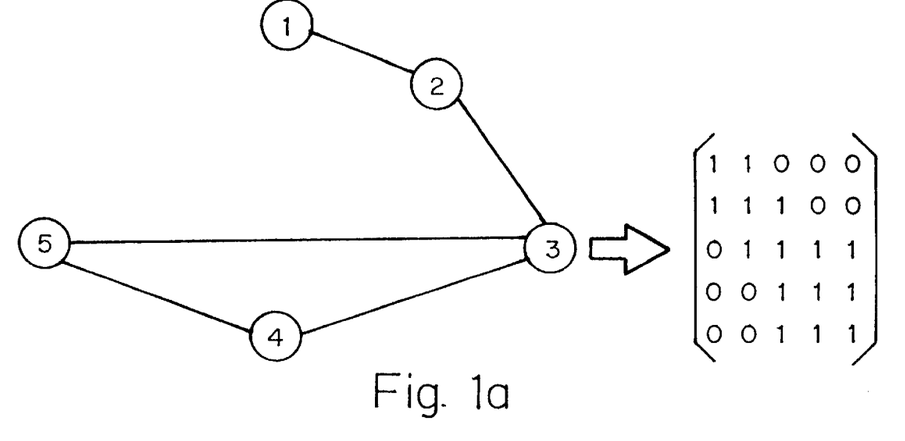
FIGS. 1(a) and 1(b) provide sample graphs showing the respective incidence matrices which they represent, according to the present invention.
Figure 1B:
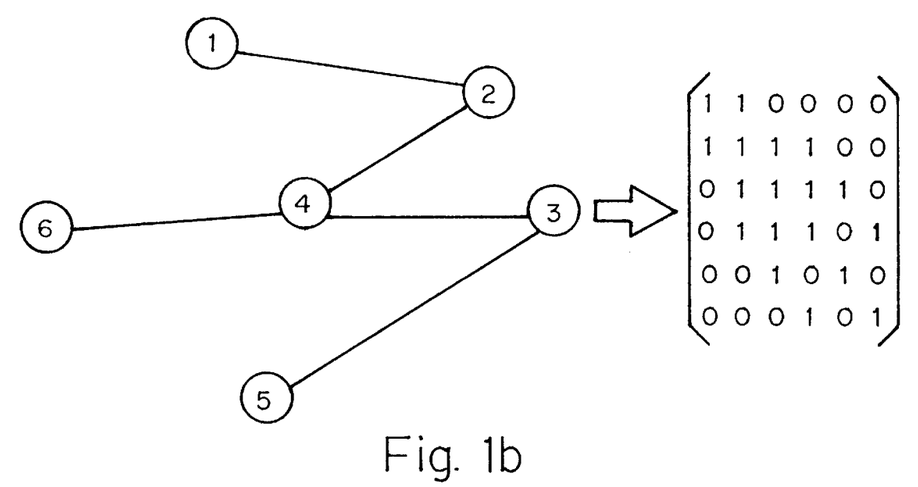

FIGS. 1(a) and 1(b) provide two examples of simple incidence matrices and the graphs which they represent. The incidence matrices are shown on the right-hand side of the figures. In the examples of FIGS. 1(a) and 1(b), the magnitudes of the elements of the incidence matrices are either zero or one. It is easy to verify that the graphs on the left-hand side correspond exactly to the matrices on the right-hand side. Note that, as a result of the definition of the elements $a_{ij}$ given above, the incidence matrices must be symmetric.

Figure 2A:
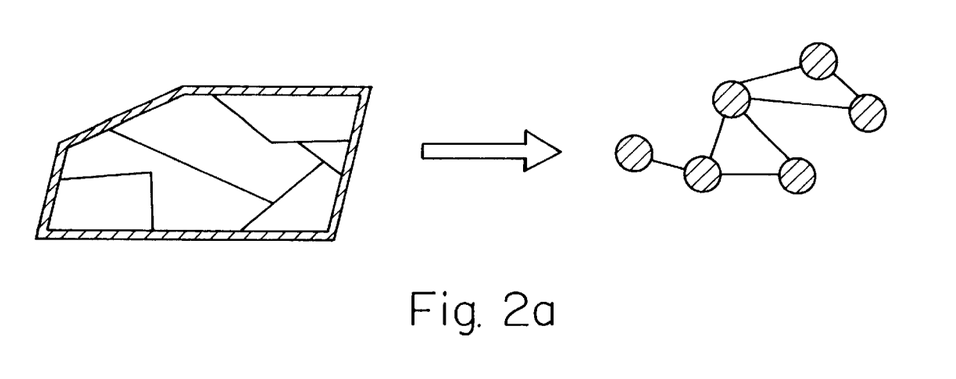
FIGS. 2(a), 2(b) and 2(c) provide diagrams showing the correspondence between planar graphs and two-dimensional representations of maps, or portions of maps, according to the present invention.
Figure 2B:
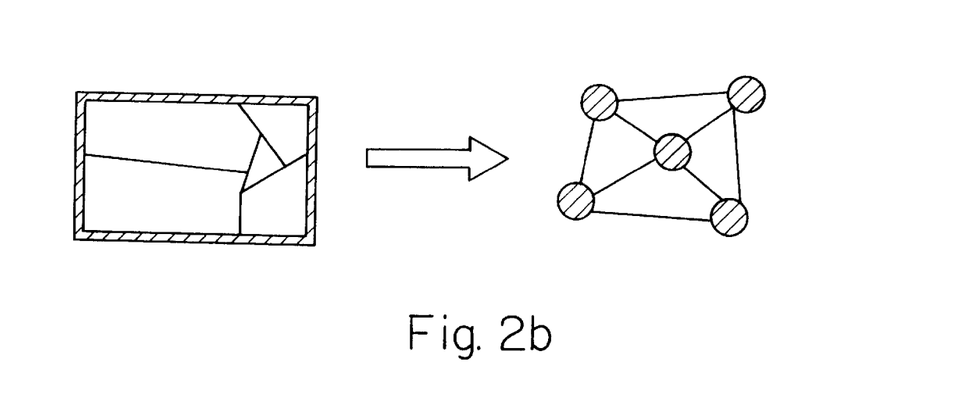
Figure 2C:
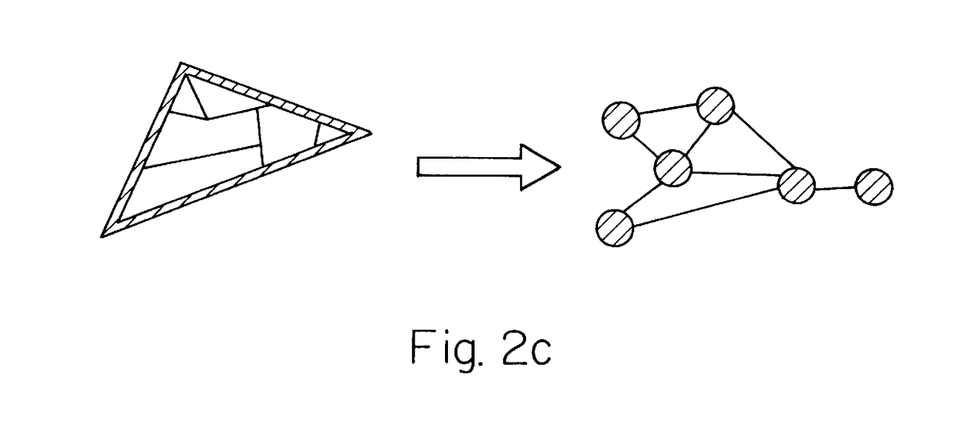

FIGS. 2(a)–2(c) provide examples of correspondence between planar graphs and simple maps. The conversion of a planar graph into a map-like structure is an essential feature of the present invention. An example of a method of performing this conversion will be explained below.

Figure 3A:
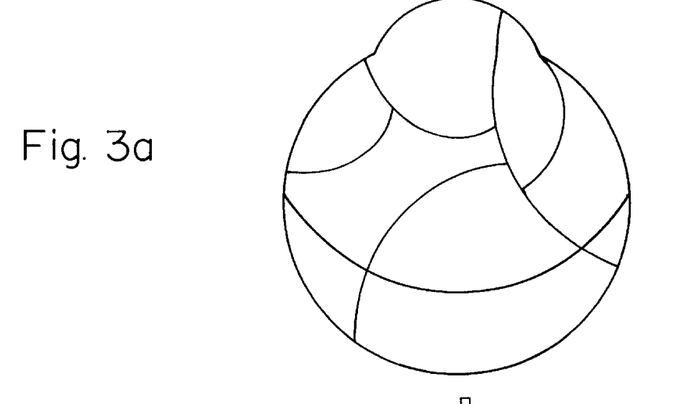
FIGS. 3(a) through 3(e) provides a series of diagrams illustrating a hierarchy of maps which represent a system, according to the present invention.
Figure 3B:
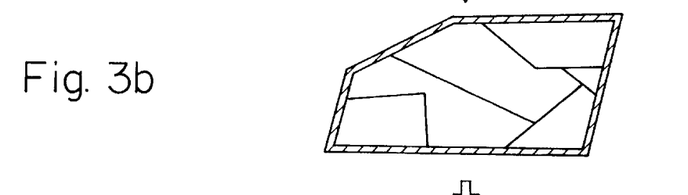
Figure 3C:
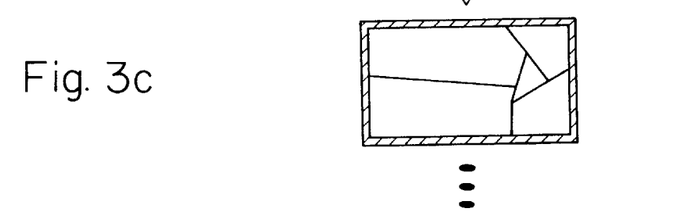
Figure 3D:
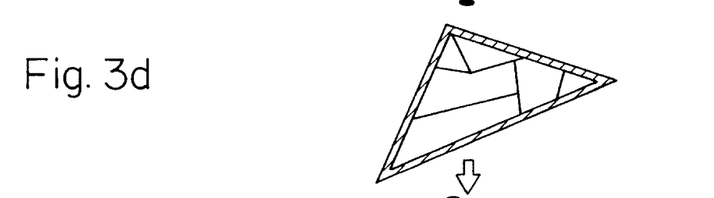
Figure 3E:
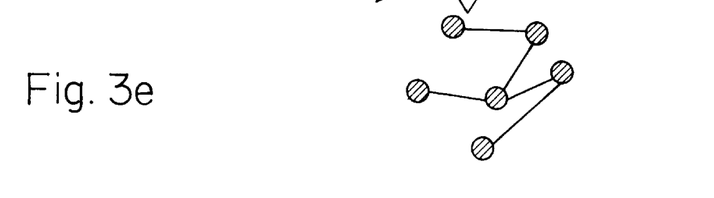

FIGS. 3(a)–3(e) provide a symbolic representation of a hierarchy of maps used in the present invention. It is an important feature of the present invention that one can represent a collection of data as a hierarchy of maps, wherein the highest level map corresponds to a planar graph derived ultimately from an original incidence matrix. FIGS. 3(a)–3(e) are only symbolic, and do not purport to show the specific method of deriving a map at one level from a map at a previous level. FIG. 3(a) represents the highest level, i.e. the level having the most coarse detail. This highest level is preferably, but not necessarily, represented as a globe or planet. FIG. 3(b) represents a map which the user would obtain by clicking on a desired region of the globe of FIG. 3(a). FIG. 3(b) therefore represents an area of detail of FIG. 3 (a). FIG. 3(c) represents another map that would be obtained when the user clicks on a desired area of the map of FIG. 3(b). The process of proceeding to ever finer levels of detail is symbolized by the ellipsis leading to FIG. 3(d), which represents another map representing a further level of detail. Finally, FIG. 3(e) shows a graph which is typical of what the user obtains when the user has reached the bottom of a particular hierarchy. That is, when the user has requested more detail from a map that has only one more level of detail to reveal, the user may obtain a graph similar to that shown in FIG. 3(e), instead of obtaining another map. The appearance of a graph, instead of a map, signals the user that the bottom of the hierarchy has been reached.

The vertices of the graph at the bottom of the hierarchy may represent files or other structures belonging to the original collection of data. The user may enter such files by clicking on the appropriate vertex. The graph shows the relationship of different files, or other structures, to each other, at the lowest level in the hierarchy. Note also that, in general, the graph of FIG. 3(e) may not represent all of the lowest level of the hierarchy of the entire collection of data, since the graph was reached by clicking through a particular path through the hierarchy. In other words, other low-level graphs could be obtained, in the most general case, depending on the choices made by the user, i.e. the specific path taken, in proceeding through the hierarchy.

The maps shown in FIGS. 3(b)–3(d) are only symbolic; the specific maps shown in the figures are not necessarily derived from each other, but are displayed only to illustrate the general concept of the invention. More specific information about how one map can be derived from another map will be given below.

Figure 4:
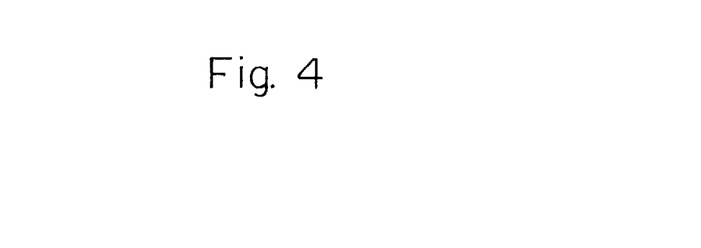
FIG. 4 provides a diagram of a two-dimensional representation of a globe which, in one embodiment of the present invention, symbolizes the entire collection of data being analyzed, and showing a selected region of the globe within a square.
Figure 5A:
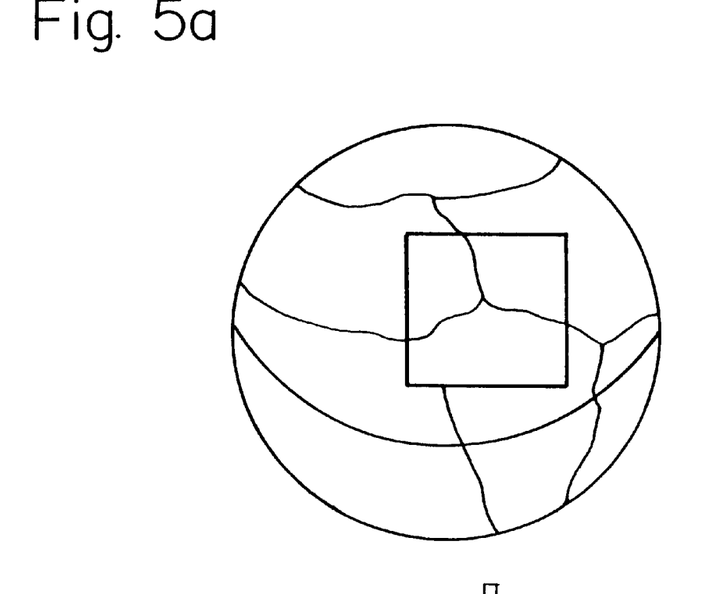
FIGS. 5(a) and 5(b) provide diagrams illustrating a transition from the diagram of FIG. 4 to a more detailed map representing the region selected from the globe.
Figure 5B:
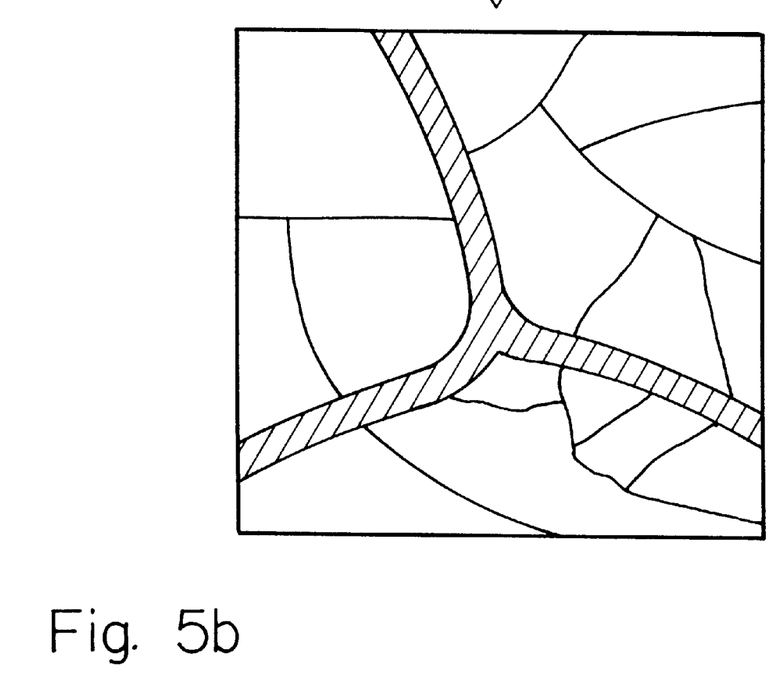

FIG. 4 illustrates a globe or planet which is the preferred means of visually representing a large collection of data. The globe represents the collection of data at its highest level, i.e. at a level showing the least amount of detail. The globe is what the user of the present invention initially sees in the ordinary operation of the invention. The square inset in the figure represents an area of interest that may be selected by the user for further analysis. The square is displayed by the program in response to the user's prompt. Other shapes, instead of a square, could be used to highlight the area of interest. In the preferred embodiment, the user may click on the square inset to obtain a map having much more detail. FIGS. 5(a) and 5(b) illustrate the latter process. Note that the heavy line in FIG. 5(b) generally follows the pattern of lines in the square inset of FIG. 5(a) (which is the same as that of FIG. 4), but that FIG. 5(b) also contains other lines which represent a further level of detail.

Figure 6A:
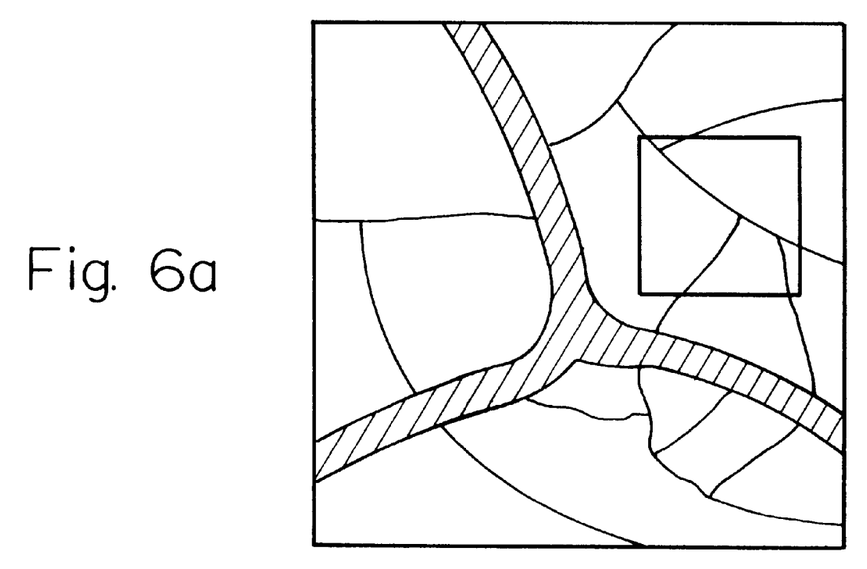
FIGS. 6(a) and 6(b) provide diagrams which represent another transition to a lower level of detail, the transition relating the diagram of FIG. 5(b) to a more detailed map representing the selected region.
Figure 6B:
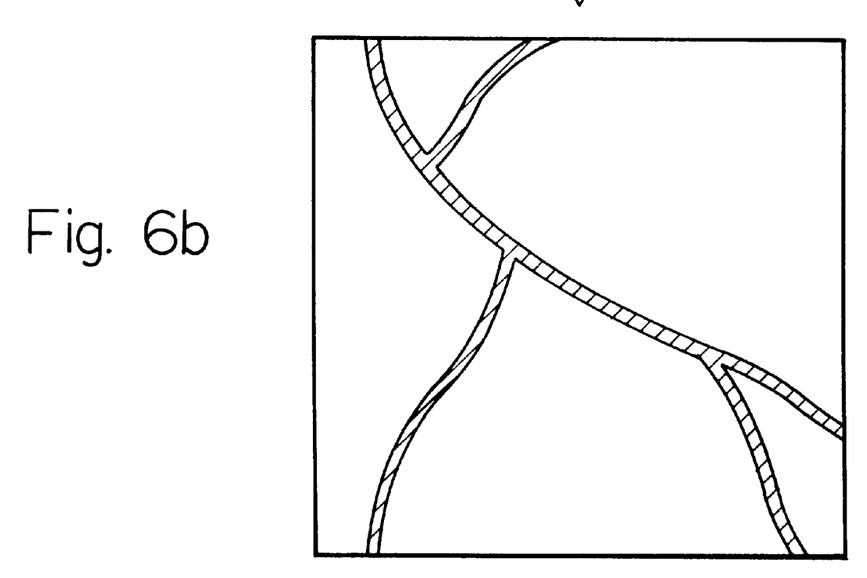

The level of detail may be increased still further, as illustrated in FIGS. 6(a) and 6(b). FIG. 6(a), which corresponds to FIG. 5(b), contains a square inset, selected by a user, such as by clicking on the desired area, and FIG. 6(b) shows the result, which is a more detailed map of the contents of that square inset.

Figure 7A:
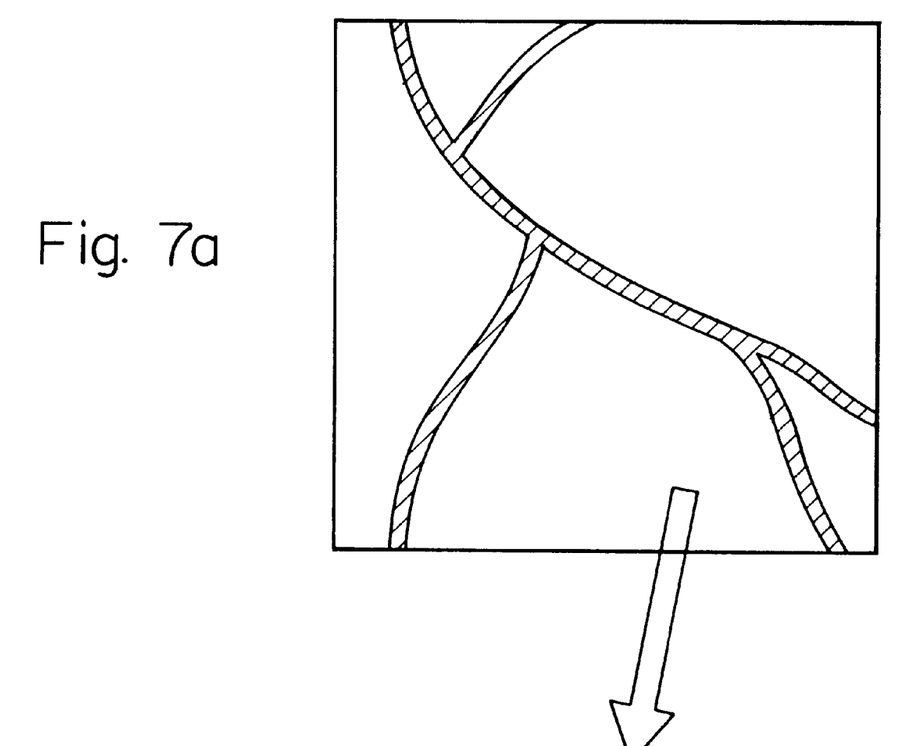
FIGS. 7(a) and 7(b) provide diagrams representing the correspondence between the detailed map shown in FIG. 6(b) and a planar graph which symbolizes the lowest-level information available in a given area of the data collection being analyzed.
Figure 7B:
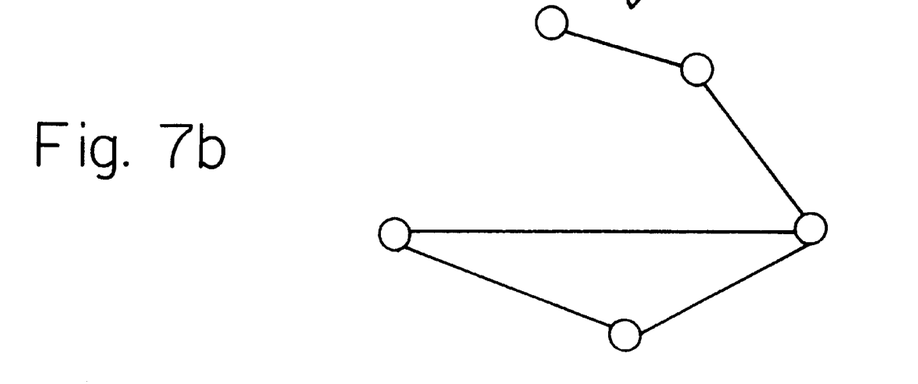

FIGS. 7(a) and 7(b) show the correspondence between the last detailed map and the graph which lies at the bottom of the hierarchy. As explained above, when the user sees a graph instead of a map, the user knows that the bottom of the hierarchy has been reached, and that by clicking on individual vertices, the user can view the contents of actual files, or other structures, belonging to the original collection of data.

The algorithms for transforming an arbitrary graph into a planar graph are known, and are fully described in the literature. These algorithms do not, in themselves, form part of the present invention. Such algorithms are described in M. Junger et al, "Solving the Maximum Weight Planar Sub-graph Problem by Branch-and-Cut", Proceedings of the Third Conference on Integer Programming and Combinatorial Optimization (IPCO) 1993, pages 479–492; P. C. Liu et al, "On the Deletion of Nonplanar Edges of a Graph", Proceedings 10th S-E, Conference on Combinatorics, Group Theory and Computer Science, Boca Raton, Fla. (1977) pp. 727–38; Eades et al, "An Efficient Heuristic for Identifying a Maximum Weight Planar Subgraph", Combinatorial Mathematics IX, Lecture Notes in Mathematics 952, pages 239–251, Springer Verlag, Berlin (1982); Cai et al, "An O(mlogn)—time Algorithm for Maximal Nonplanar Sub-graph Problem", SIAM J. Comput. 22 (1993) pp. 1142–1162; K. Kuratowski, "Sur le Probleme des Courbes Gauches in Topology", Fund. Math. 15 (1930) pages 271–283; Harary, "Graph Theory", Addison-Wesley (1969).

The representation of an arbitrary collection of data as a graph is straightforward. For example, vertices can correspond to files (elements) and edges can correspond to transitions between them. In general, such a graph is non-planar, and its structure might be very complicated. However, using standard algorithms, one can reduce the graph of any structure to a planar graph. The reason for reducing a non-planar graph to a planar graph is that a planar graph can be readily converted to a map which can be displayed on a video monitor or equivalent.

One method of converting a non-planar graph to a planar graph is to delete one or more of its edges. In general, removing edges from a graph will simplify the structure of the graph, and it can be shown that removal of a sufficient number of edges will convert any non-planar graph into a planar one.

Figure 8:
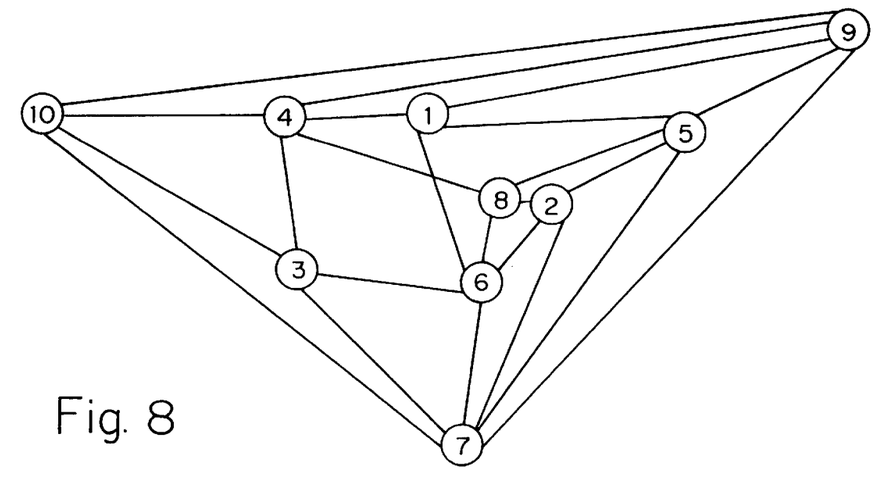
FIG. 8 provides an example of a non-planar graph which will be converted to a planar graph during the operation of the present invention.
Figure 9:
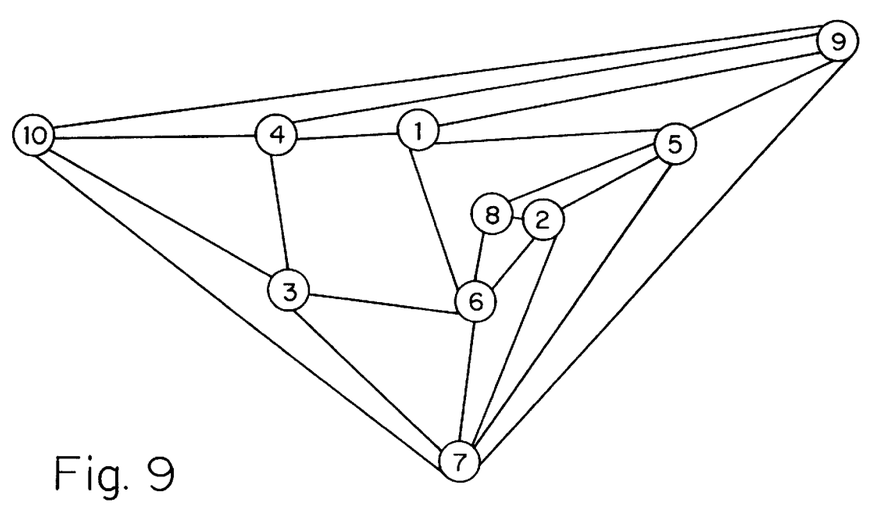
FIG. 9 shows a planar graph which has been formed by removing an edge from the graph of FIG. 8, in the operation of the present invention.

The process of converting a non-planar graph into a planar graph is illustrated in FIGS. 8 and 9. FIG. 8 shows a non-planar graph having ten labeled vertices. That the graph is non-planar is clear from the fact that edge (1, 6) intersects edge (4, 8). (As used herein, the expression (a, b) means the edge which joins vertices a and b.) The graph can be made planar by deleting either edge (1, 6) or edge (4, 8). FIG. 9 shows the graph where edge (4, 8) has been deleted. This graph is planar.

It is therefore clear that one method of converting a non-planar graph into a planar graph is to use a computer to delete one edge at a time, and to determine whether the result is planar. In other words, a computer can be programmed to perform the conversion by trial and error. The computer can be programmed to determine whether or not a given graph is planar: such a program is within the level of skill of a person skilled in computer programming and graph theory. The computer can be further programmed to delete all possible combinations of edges, until it finds a graph that is planar. In the preferred embodiment, where the edges are encoded with values, which might represent the strength of an interaction between vertices, the computer program would be designed to favor the deletion of those edges having the smallest values. In this way, the planar graph that is ultimately obtained will be a reasonably good approximation to the actual collection of data.

The computer program described above is only one means of performing the conversion. Other methods, such as those described in the literature cited above, could be implemented on a computer, within the level of skill in the art. Any of such methods can be used, within the scope of the present invention.

The following section describes a procedure for converting a planar graph into a map. Suppose, in particular, that one wishes to convert the graph of FIG. 9 into a map. The first step is to define a boundary of the map, which boundary comprises the set of external edges. These are the edges (9,10), (7,9), and (7,10). The latter edges have been drawn in heavy outline in FIG. 10. At this point, the interior of the graph comprises a plurality of polygons.

Figure 10:
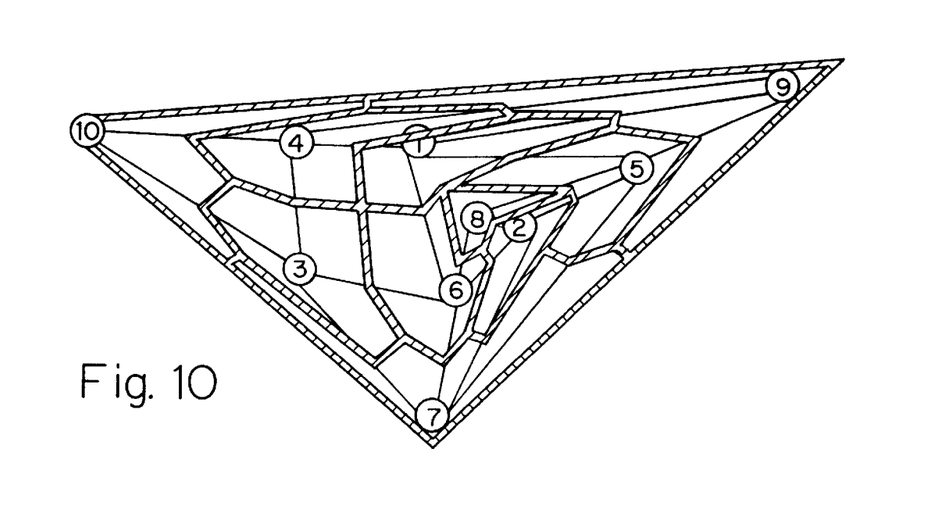
FIG. 10 illustrates the conversion of the graph of FIG. 9 into a map having various regions.
Figure 11:
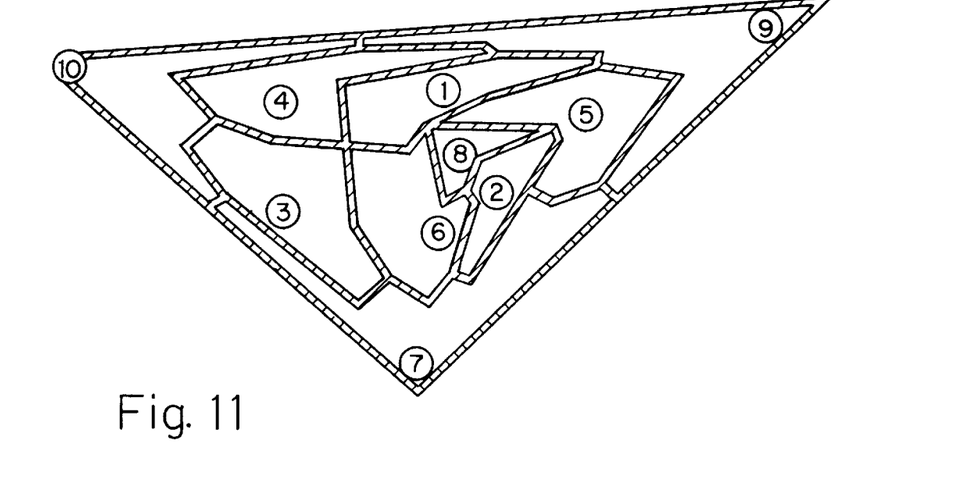
FIG. 11 illustrates a map which is formed by deleting the edges of the graph shown in FIG. 10.
Figure 12:
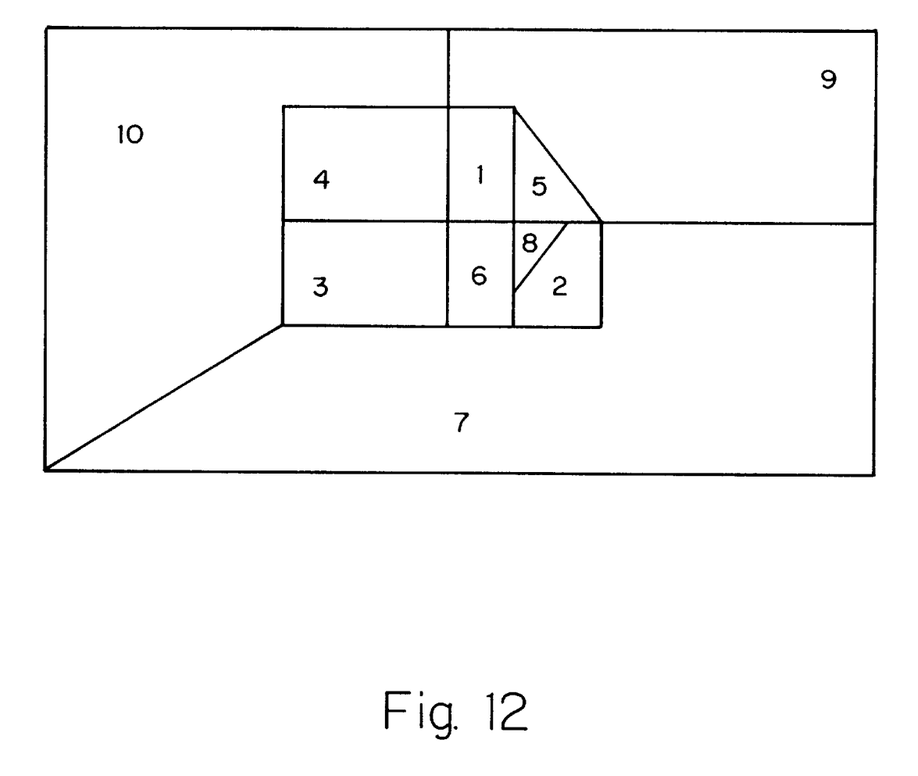
FIG. 12 illustrates a variant of the map of FIG. 11, wherein the shapes of the regions therein have been altered.

Next, one selects an arbitrary point inside each polygon, and connects that point with the midpoint of each side of the polygon. The result is shown in FIG. 10. Finally, one removes the original edges, leaving only the borders created by the above procedure. The result is shown in FIG. 11. FIG. 11 is now a map, rather than a graph; the vertex labels now define regions instead of vertices. But FIG. 11 can be further changed by changing the shapes of the regions, as illustrated by FIG. 12. FIG. 12 shows a map which is topologically equivalent to FIG. 11, in the sense that the various regions have the same common boundaries, though the area of each region may be different.

There are many other ways of constructing a map from a given graph. Instead of using an arbitrary point in the middle of the polygon, one can use an arbitrary point on an edge. The regions of the resulting map therefore will have radically different areas. The area of each region, along with other characteristics, might be used as characteristics of the map which can be addressed by the user.

Where two areas contact each other at a single point, that point is not considered a boundary between the two areas. Instead, one could draw a "lake" around such a point, in the form of a dashed circle, for example, which completely separates the areas that have contact with the point of interest.

The present invention is not limited by the specific method used to convert a planar graph to a map, or by the method used to convert an initially non-planar graph to a planar graph. Various methods can be used to perform these operations, and these methods, by themselves, do not form part of the invention. All such methods could be used in the practice of the present invention.

The present invention can be used to analyze many different kinds of data. The following is a description of some of the practical applications of the invention.

1. The invention can be used to construct and analyze "business globes" or business maps. Such maps would have a quasi-geographic significance, but would be, in general, greatly altered to reflect the conditions of the field being analyzed. For example, if one is analyzing the production of watches, the business map might show Switzerland as a superpower, with Hong Kong as its substantial neighbor. A business map relating to the production of mango juice might show Hawaii as a superpower, and Switzerland might not even exist at all. In general, one can construct a "business globe" of the world, or of a region of the world, with respect to any particular kind of business. One could even switch the maps among different kinds of business, thereby changing the appearance of each hierarchy of maps.

2. The invention can be used as a self-analyzer and organizer. The system can be programmed to detect and store the order and time of telephone calls made by a user through a computer. The software then transforms the stored data into a hierarchy of planar graphs, as described above. This set of graphs is more than a standard telephone organizer, because it allows the user to see, on a video monitor, a map or series of maps which represent the true organization of telephone calls. The user might find that the organization of the calls is very different from that which the user had entered into a conventional telephone notebook (i.e. which may list persons and their telephone numbers according to an alphabetical arrangement, or arranged by subject). Clicking one of the areas in the initial globe opens a map of the "call country". Clicking one of the areas on the "call country" opens another map of a "sub-country". Repeated clicking (to reach the lowest level of the hierarchy) allows the user to reach individual telephones: clicking on the telephone dials the associated number. Alternatively, one can open any telephone with its "neighborhood", the neighborhood representing the set of telephones which are generally dialed in order or within a short period of time. These telephones are grouped and visually connected, by the map produced by the system of the present invention, in accordance with the real needs of the user.

3. The invention can analyze the use of a personal computer. It can detect the order of opening of "windows" by the user, and the relationship between various "windows" can be represented by the hierarchy of two-dimensional maps.

4. The invention can analyze interactions among groups of persons. For example, suppose the data collection relates to a group of persons having some interrelationship. The persons being analyzed might be employees of a company, criminals arrested by the police in a given year, a school, or a group of relatives, including royal families. The system of the present invention establishes and visually represents the true interrelationships within these groups. In the case of employees of a company, the representation might show an organization of the company which may not coincide with the mode of organization intended by company officers. In the case of criminals arrested by the police, the system can reveal non-formal relationships among these criminals. In the case of groups of relatives or royal families, the system can allow a user to analyze the true relationships among members of a group.

5. The invention can be used in storing and retrieving information obtained from experience with consumers. The system can be programmed to detect and save the inquiries of consumers, in the order the inquiries were received. Then, the system can generate an incidence matrix representing relationships between various consumer inquiries. When the matrix is converted into the hierarchy of two-dimensional maps, as described above, a new consumer can observe, and switch between, various files that were found by other consumers. Thus, the consumer can use the experience of previous consumers to find information about a product, instead of having to rely solely on advertising.

6. The invention can be used in decision-making, in the context of an installation with dozens or hundreds of terminals, such as a military base, an airport, or other facility. It may turn out that the operation of the facility is very different from what would be expected from the manner in which the facility is organized. The hierarchy of maps generated by the present invention can be used to analyze the system in ways not possible by reference to data presented in conventional form.

Note that some of the above-described examples, the present invention employs a heuristic program which automatically determines the interactions or interrelationships among elements of a collection of data. For example, in case No. 3, above, the program itself determines the interactions among various elements of the data structure. In other cases, however, such as in the case of a previously compiled database, the relationships among elements of the data collection are already established, and the incidence matrix can be constructed directly. Whether the invention is used with a heuristic program which determines interactions by analyzing operations performed by various users, or whether it is used with a static set of data, the basic operation of the invention is essentially the same. That is, it represents the collection of data as a hierarchy of maps that can be meaningfully displayed to the user.

The above description implicitly assumes that the program has a graphical user interface which allows the user to manipulate a mouse to select specific areas on a screen. However, the invention is not limited to any particular kind of user interface. For example, the invention could also work well with an interface that merely requires the user to manipulate keys on a keyboard to highlight an area of interest. All such interface arrangements should be considered within the scope of the present invention.

While the invention has been described with respect to certain specific embodiments, many variations are possible within the scope of the disclosure. Such variations should be considered within the spirit and scope of the following claims.

What is claimed is:

1. A method of visual representation of a collection of data, the method comprising the steps of:
   a) deriving an incidence matrix representing interrelationships among elements in the collection of data,
   b) using the incidence matrix to obtain a plurality of planar graphs,
   c) converting at least one of said planar graphs into a two-dimensional map, and
   d) displaying at least one said two-dimensional map on a computer display.

2. The method of claim 1, wherein step (a) also includes the step of dividing the incidence matrix into a plurality of clusters, and wherein the incidence matrix represents interrelationships among the clusters.

3. The method of claim 2, further comprising the step of repeating steps (a) through (d) with respect to each of said clusters.

4. The method of claim 1, wherein the two-dimensional map includes a display of geographical features which represent an aspect of structure of the data collection.

5. The method of claim 1, wherein step (d) comprises the step of displaying a plurality of maps, said plurality of maps defining a hierarchy wherein one of said plurality of maps represents a detail of another of said plurality of maps located at a higher level in the hierarchy.

6. The method of claim 5, wherein there is a lowest level in the hierarchy, and wherein the lowest level is represented by a graph.

7. A method of visually representing a collection of data, comprising the steps of:
   a) storing information pertaining to interrelationships among elements of the collection of data in a computer memory, b) deriving from said information a hierarchy of planar graphs, each graph belonging to a particular level in the hierarchy, c) converting at least some of said planar graphs into respective two-dimensional maps, and d) displaying at least some of said maps on a computer monitor.

8. The method of claim 7, wherein the maps have a hierarchy corresponding to the hierarchy of the planar graphs, and wherein a map of a given level represents a detail of a portion of a map belonging to a next-higher level.

9. Apparatus for visual representation of a collection of data, comprising:

a) means for deriving an incidence matrix representing interrelationships among elements in the collection of data, b) means for using the incidence matrix to obtain a plurality of planar graphs, c) means for converting at least some of the planar graphs into a two-dimensional map, and d) a computer display, connected to said converting means, for displaying at least one said two-dimensional map.

10. The apparatus of claim 9, wherein the deriving means also includes means for dividing the incidence matrix into a plurality of clusters, and wherein the incidence matrix represents interrelationships among the clusters.

11. The apparatus of claim 9, wherein the two-dimensional map includes a display of geographical features which represent an aspect of structure of the data collection.

12. Apparatus for visually representing a collection of data, comprising:

a) means for storing information pertaining to interrelationships among elements of the collection of data in a computer memory, b) means for deriving from said information a hierarchy of planar graphs, each graph belonging to a particular level in the hierarchy, c) means for converting each of said planar graphs into respective two-dimensional maps, and d) a computer monitor, connected to said means for converting, for displaying at least some of said maps.

13. The method of claim 12, wherein the maps have a hierarchy corresponding to the hierarchy of the planar graphs, and wherein a map of a given level represents a detail of a portion of a map belonging to a next-higher level.

* * * * *